United States Patent [19]

Gasper

[11] 4,427,283

[45] Jan. 24, 1984

[54] SCRATCH SUPPRESSING ILLUMINATION SYSTEM FOR PHOTOGRAPHIC PRINTER

[75] Inventor: John Gasper, Hilton, N.Y.

[73] Assignee: Eastman Kodak Company, Rochester, N.Y.

[21] Appl. No.: 265,755

[22] Filed: May 21, 1981

[51] Int. Cl.³ .............................................. G03B 27/00
[52] U.S. Cl. ...................................... 355/1; 350/96.28
[58] Field of Search ............... 355/1, 70, 71; 350/445, 350/96.28; 353/97, 98, 38; 362/328

[56] References Cited

U.S. PATENT DOCUMENTS 2,604,005  7/1952  Hahn ..................................... 353/38
3,217,594  11/1965  Simmon ................................. 350/96

*Primary Examiner*—Richard A. Wintercorn
*Attorney, Agent, or Firm*—Thomas H. Close

[57] ABSTRACT

An illumination system for a photographic printer having a printer lens and a film gate, includes a light source for producing a beam of light directed toward the film gate, reflecting means disposed between the light source and film gate for intercepting peripheral portions of the beam and redirecting the peripheral portions toward the film gate, so that the light emerging from the reflecting means has a characteristic angular spread of between about ±35° and ±65°, and means for conditioning the light emerging from the reflecting means such that the image produced by the printing lens is substantially uniformly illuminated, and such that the angular spread of the light is not substantially increased, thereby providing a relatively highly efficient scratch suppressing illumination system.

17 Claims, 10 Drawing Figures

FIG. 3
_PRIOR ART_
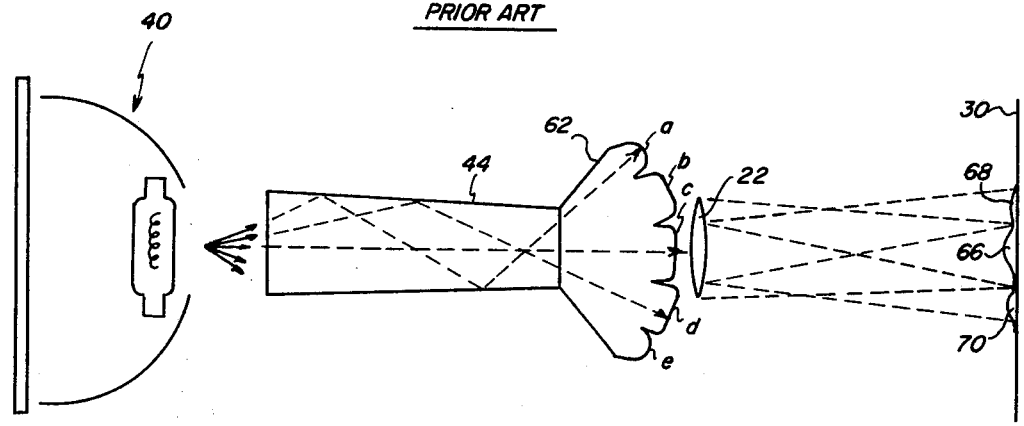
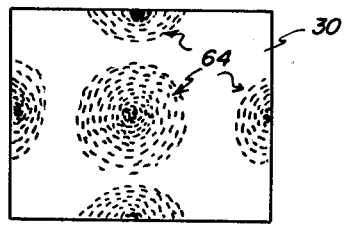
FIG. 4
_PRIOR ART_
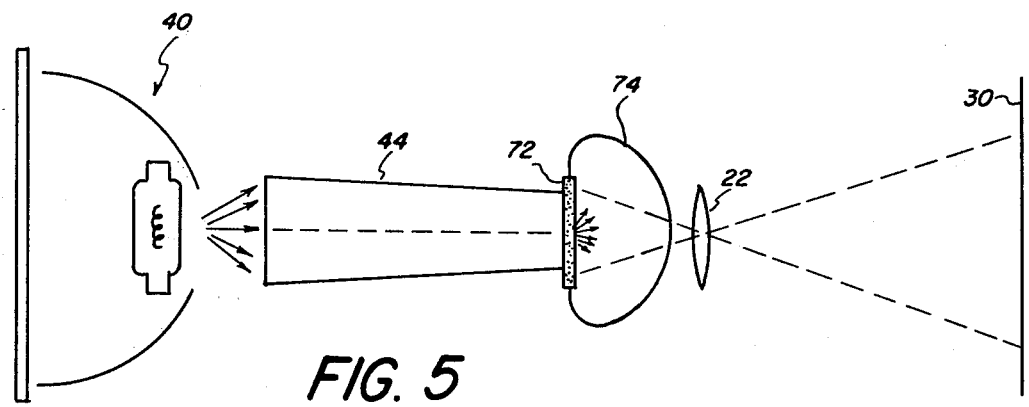
FIG. 5
_PRIOR ART_

SCRATCH SUPPRESSING ILLUMINATION SYSTEM FOR PHOTOGRAPHIC PRINTER

BACKGROUND OF THE INVENTION

1. Field of the Invention

The present invention relates in general to illumination systems for photographic printers, and more particularly to such illuminations systems adapted for suppressing the appearance of film scratches in the print.

2. Description Related to the Problem

FIG. 1 is a schematic diagram of a prior art color photographic printer of the type commonly employed by photofinishers for making color photographic prints from color negatives. The printer, generally designated 20, includes a printing lens 22, having an aperture stop 24, for projecting an image on a film 26, centered in a film gate 28, onto photographic paper 30. The film 26 is transported through the printer by a film transport system including a takeup 32 and a supply 34. Similarly, the photographic paper is transported through the printer by a paper transport system including a paper takeup 36 and paper supply 38. An illumination system for illuminating the portion of film 26 in film gate 28 includes a lamphouse generally designated 40, a set of dichroic filters 42 for adjusting the color balance of light emitted from the lamphouse 40 and a "tapered integrating bar" 44 generally of rectangular cross section and having a slight taper $\alpha$ of about 0°–2°, depending on the film format. The integrating bar gathers some of the off-axis illumination emitted by the lamphouse 40 and redirects the light into the film gate 28. Lamp house 40 comprises a high intensity light bulb 46, an ellipsoidal reflector 48 and a cold mirror 50. Most of the light from lamp 46 is directed by ellipsoidal reflector 48 toward cold mirror 50. The infrared portion of the spectrum passes through cold mirror 50 and the visible portion of the spectrum, required for printing, is reflected from cold mirror 50 back through a hole 52 in ellipsoidal reflector 48 toward film gate 28.

The three main goals in the design of an illumination system for a photographic printer are uniformity, scratch suppression and high efficiency. Uniformity means that the illumination at the paper plane is substantially uniform in both intensity and color balance so that there are not objectionably visible "hot spots" or colored patterns in the resulting print. The role of the illumination system in suppressing scratches can be explained with reference to FIG. 2. A cross section of a scratch in film 26 is schematically depicted in FIG. 2 as a V-shaped groove having sides or facets 54 and 56. Each facet of a scratch causes the film to act as a prism to refract a ray of light away from its normal path. As shown in FIG. 2, facet 54 of the scratch refracts an axial ray 58, that normally would have passed through aperture 24 of lens 22, out of the aperture. If all of the light rays from the illumination system in the vicinity of the scratch were parallel to ray 58, i.e. if it is a specular light source, no light in the region of facet 54 would reach the paper, thereby causing the scratch to appear as a white line in the resulting print when printing from a negative. However, if some off-axis rays are available, such as ray 60 which normally would not have passed through aperture 24, these off-axis rays will be refracted by facet 54 into the aperture 24 of lens 22, thereby "filling in" the light that was lost and suppressing the appearance of the scratch in the print. Thus, an illumination system which provides highly diffuse light, in which many off-axis rays are available, is desirable for suppressing the appearance of scratches in negatives.

The cost of providing a source of highly diffuse light for good scratch suppression is a loss in efficiency. The efficiency of an illumination system for a photographic printer is a measure of how much light coming from the illumination system actually gets through the aperture of the printing lens. When the light is highly diffuse, necessarily much of the light emitted by the illumination system will miss the aperture 24. The more light that can be passed through the aperture to the printing lens, the shorter the exposures need to be to expose a print. In modern high-speed photographic printers, the required exposure time is a critical factor in limiting the top speed of operation of the printer. Of course, the amount of light that passes through the printing lens aperture can be increased by increasing the intensity of the light source without regard to the efficiency of the illumination system. However, there is a limit imposed by power and cooling requirements that cannot be exceeded. Most modern printer light sources already operate at or near this limit. Therefore, increasing the efficiency of an illuminating system is one method of improving the maximum possible speed of the printer.

The prior art illumination system described thus far with reference to FIG. 1 would produce a pattern of illumination as shown in FIG. 3. A cross section of the illumination at the output end of the integrating bar 44 describes a fan-like pattern 62 composed of a plurality of beams, for example a–e. As shown in FIG. 3, the beam emerging from the integrating bar has an angular spread of about ±50°. The zeroth ordered beam "c" is produced by the rays of light which pass through integrating bar 44 with no internal reflections. The first order beams "b" and "d" are formed in rays of light passing through the integrating bar 44 with only one reflection. The second order beams "a" and "e" are formed by rays of light passing through the integrating bar with two reflections. As can be seen in FIG. 3, the illumination system is capable of providing good scratch suppression since there are plenty of off-axis rays of light that can be shifted into the printing lens 22 by the facets by scratches on the film. Each facet of a scratch may be imagined as having the effect of pivoting the fan of light rays about the end of integrating bar 44. Unfortunately, however, if the illuminating system shown in FIG. 3, is used "as is" the illumination in the paper plane 30 exhibits a pattern of "hot spots" 64, shown in FIG. 4. The reason for this nonuniformity in illumination can be seen in FIG. 3. The illumination from the zeroth order beam "c" is focused by lens 22 at some point between the printing lens and the paper plane 30 and forms a distribution of illumination 66 near the center portion of the paper plane 30. The light from first order beams "b" and "d" are likewise focused by lens 22 in a plane between the lens and the paper plane 30 and form distributions of illumination 68 and 70 to either side of the central distribution of illumination 66.

To achieve uniformity in the prior art printer illumination system, a strong volume diffuser such as a sheet of translucent Plexiglas 72 (see FIG. 5) was placed at the end of the integrating bar 44. The resulting pattern of light emerging from the end of the bar is shown in FIG. 5. As seen in FIG. 5, uniformity of the illumination is greatly improved without sacrificing the scratch suppressing qualities of the illumination system. However, since the angular spread of the fan of light 74 emerging from the illumination system has been greatly increased, from about ±50° to ±90° with an accompanying decrease in total transmittance, the effieciency of the illumination system has been decreased by about half. Much more of the light emitted by the illumination system now escapes the aperture of printing lens 22. A tradeoff has been effected between uniformity and efficiency. As stated above, this reduction in efficiency lowers the maximum speed at which the printer can be operated. Thus the inventor was faced with the problem of providing an illumination system for a photographic printer that would preserve the scratch suppressing characteristics and high uniformity of the prior art illumination systems, while increasing the illumination efficiency thereof.

SOLUTION OF THE PROBLEM—SUMMARY OF THE INVENTION

The problem described above is solved according to the present invention by providing an illumination system for a photographic printer, having a printing lens and a film gate, that includes a light source for producing a beam of light directed toward the film gate. A reflector, disposed between the light source and the film gate, intercepts peripheral portions of the beam and redirects the peripheral portions toward the film gate. The beam emerging from the reflector has a characteristic angular spread of between about ±35° and ±65°. In addition, means are provided for conditioning the light emerging from the reflector such that: (1) the image produced by the printing lens is substantially uniform , (2) the angular spread of the light is not substantially increased, and (3) the total amount of light exiting the integrating bar is not significantly attenuated, thereby providing a relatively highly efficient scratch suppressing illumination system. In one embodiment of the invention, the light conditioning means is a condenser lens disposed between the reflecting means and the film gate and adapted to form multiple images of the light source at the aperture of the printing lens such that the first order images of the light source are about half in and half out of the aperture. In the preferred embodiment of the invention, the light conditioning means is a fibre optic plate disposed at the exit end of the reflecting means and adapted to light pipe and diffract axial rays within a diffraction pattern of controlled angular spread and to light pipe and diffract off-axis rays into annular cones also of controlled angular spread. The angular spread of the diffraction pattern is governed by the fibre diameter and the total transmittance of the plate is greater than for diffusers of the prior art.

According to another feature of the present invention, the light source is constructed so that its off-axis luminance is 5-10% greater than its axial luminance, and the light conditioning means preserves this nonuniformity, thereby further improving the scratch suppressing qualities of the illumination system.

BRIEF DESCRIPTION OF THE DRAWINGS

The invention will be described with reference to the drawings, wherein:

FIG. 3 is a schematic diagram showing the pattern of light output of the illumination system in the printer shown in FIG. 1;

FIG. 4 is a schematic diagram illustrating the intensity distribution in the paper plane from the illumination system depicted in FIG. 3;

FIG. 5 is a schematic diagram showing the pattern of light output of the prior art illumination system shown with the printer in FIG. 1, including a prior art diffusing element for improving the uniformity of illumination in the paper plane;

DESCRIPTION OF THE PREFERRED EMBODIMENTS

Figure 6:
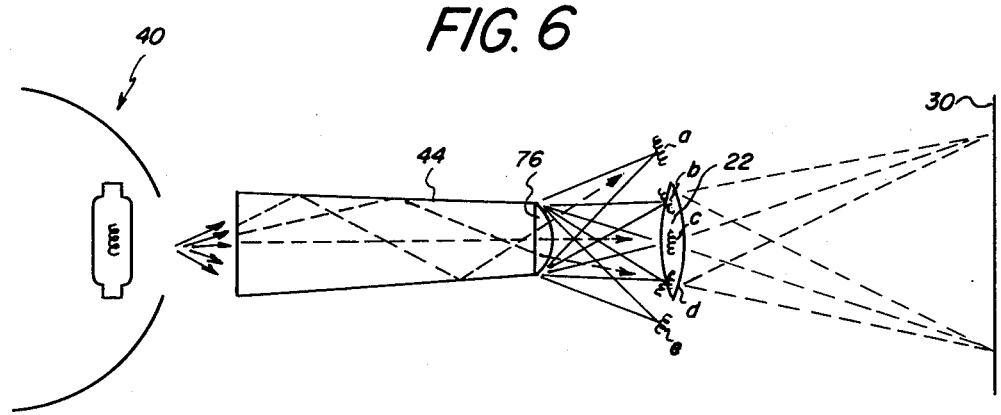
FIG. 6 is a schematic diagram showing the pattern of light output from one embodiment of an illumination system according to the present invention, employing a condensing lens as a light conditioning element.

According to a first embodiment of the present invention, see FIG. 6, a condenser lens 76 is constructed at the exit end of integrating bar 44. Condenser lens 76 forms a rosette pattern of images of light source 40, a cross section of which is shown. The zeroth order image "c" of light source 40 is formed by rays which pass unreflected through integrating bar 44. The first order images "b" and "d" of light source 40 are formed by rays which undergo one reflection in passing through integrating bar 44. And the second order images "a" and "e" of light source 40 are formed by rays which undergo two reflections in passing through integrating bar 44, as shown in FIG. 6. Higher order off-axis images may also be present. The relationship between the dimensions of the tapered integrating bar, the focal length of condensing lens 76, and the distances from the light source to the condensing lens and from the condensing lens to the printing lens are chosen such that the zeroth order image "c" of the light source 40 is centered in the aperture of the printing lens 22 and the first order images "b" and "d", are about one-half in and one-half out of the aperture of printing lens 22. For example, in a Kodak Printer Model 2610 with (1) a Kodak variable color lamphouse model 26000, (2) a printing lens model J220, and (3) an integrating bar with an entrance aperture of 20 mm×20 mm, a length of 210 mm, and an exit aperture of 16 mm×20 mm, a plano-convex condenser lens of 38 mm focal length was employed. The condenser lens was cemented to the end of the integrating bar, but could also be integrally formed on the end of the bar, for instance by the use of optical molding techniques.

Since some of the images of the light source are formed in the aperture of the printing lens by condensing lens 76, the illumination of the paper plane is substantially uniform. Each such image, or portion thereof, of the light source contributes to illumination distributed evenly over the paper plane 30, the separate contributions from the zeroth and first order image being superimposed upon one another as shown in FIG. 6. The angular spread of light emerging from the illumination system is about ±50°, which is about half that of the prior art (compare FIG. 6 with FIG. 5). The narrower angular spread, combined with the fact that the lens is more transparent than the volume light diffusers of the prior art, means that the efficiency of the illumination system according to the present invention is nearly twice that of the prior art. Although the angular spread of the light emerging from the illumination system was ±50°, theoretical calculations indicate that ±45° would be about optimum, with angular spreads between about ±35° and about ±65° being an operative range for practice of the invention.

Figure 7:
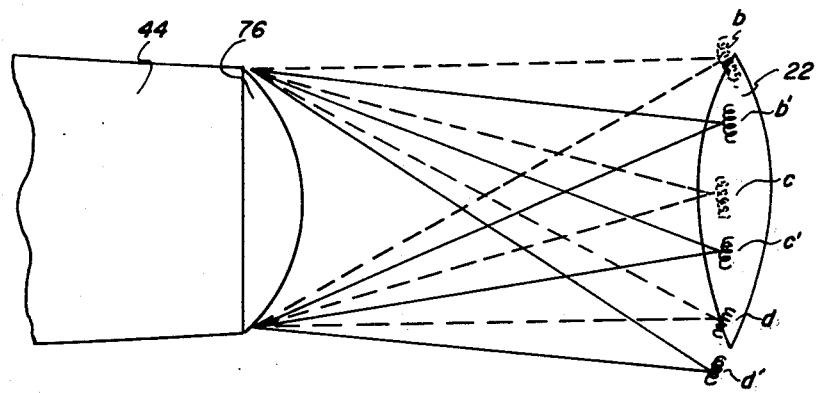
FIG. 7 is a schematic diagram of a portion of the illumination system shown in FIG. 6 illustrating the effect of one facet of a scratch on the pattern of light emitted by the illumination system of FIG. 6.

Good scratch suppressing characteristics are provided by the illumination system according to the present invention. As illustrated in FIG. 7, a facet of a scratch causes all of the images of the light source 40 to be deflected. The undeflected images (i.e. without a scratch) of the light source are shown in dotted lines in FIG. 7. The images deflected by a facet of a scratch are shown in solid lines and labeled with primes (') in FIG. 7. As shown in FIG. 7, when a scratch deflects one image of the light source, e.g. image d', out of the aperture of the printing lens 22, another image, e.g. b', is deflected into the aperture, thereby compensating for the loss of light due to the scratch, and suppressing the appearance of the scratch in the print.

Although the embodiment of the invention employing a condenser lens to form multiple images of the light source in the plane of the aperture of the printing lens provides an efficient scratch suppressing illumination system, it has one drawback in that the dimensions of the intergrating bar and the focal length of the condenser lens are specific to each particular printing lens and aperture size. When the focal length of the printing lens or the size of the aperture is changed, a different integrating bar/condenser lens combination is required to form the images of the light source in the aperture so that the first order images are formed about one-half in and one-half out of the aperture. Although this embodiment of the invention is perfectly adequate for a dedicated printer that is set up for only one task, the use of a separate integrating bar/condenser lens combination for each printing lens aperture setting is impractical when the aperture of the printing lens is to be adjusted frequently.

This problem is overcome in the preferred embodiment of the invention, wherein instead of a condenser lens, a fibre optic plate is employed to condition the light emerging from the integrating bar 44. The fibre optic plate is formed from a large bundle of parallel, cladded optical fibres that are fused together to form a rod. A slice is cut from the rod and the surfaces polished to make the fibre optic plate. Such fibre optic plates can be purchased from Galileo Electro-Optics Corporation.

Figure 8:
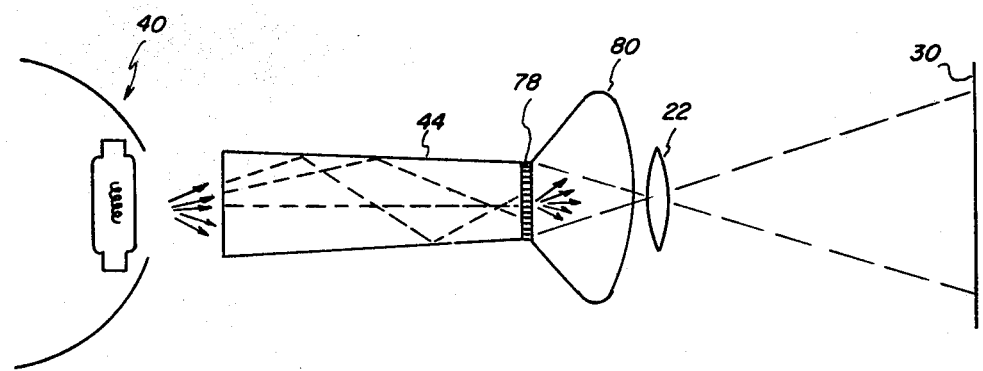
FIG. 8 is a schematic diagram showing the pattern of light output from a preferred embodiment of the invention employing a fibre optic plate as a light conditioning element.
Figure 9:
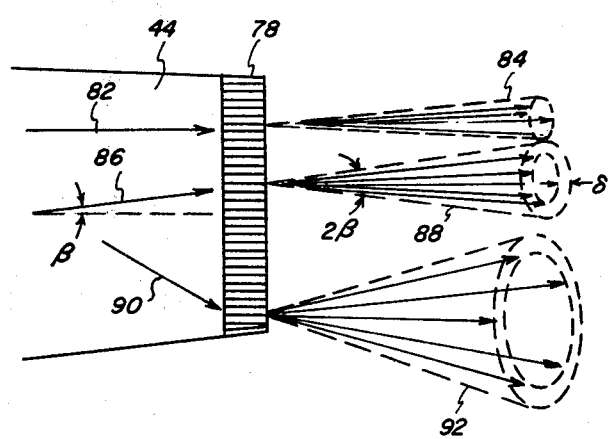
FIG. 9 is a schematic diagram showing the light diffracting effect of the fibre optic plate on a family of light rays.

FIG. 8 illustrates the illumination system according to the preferred embodiment of the invention. The fibre optic plate 78 diffracts light into a uniform fan of diffuse light. The effect of the fibre optic plate 78 on several rays is shown in FIG. 9. As shown in FIG. 9, axial rays 82 are diffracted into a narrow cone 84 having an angular spread of only a few degrees (e.g. about 5°-10°). An off-axis ray 86 is diffracted into an annular cone having a half angle $\beta$ equal to the angular deviation of the off-axis ray, and a thickness $\delta$ substantially equal to the cone angle of the diffracted axial ray. A more highly off-axis ray 90 is scattered into a larger annular cone 92. The effect of the fibre optic plate is to produce a highly diffuse illumination with a controllable overall dispersion. The illumination system is efficient due to the controlled angular dispersion, as can be seen by comparing the angle of dispersion in FIG. 8 with that shown in FIG. 5, and due to the greater transparency of the fibre optic plate. The illumination produced at the paper plane is substantially uniform, and good scratch suppression is provided since there is plenty of off-axis illumination to fill in the scratches. Fiber optic plates comprised of fibres from about 1 to about 20 microns in diameter can be used. The best results were obtained with plates composed of 3–10 micron fibres, several millimeters thick. The thickness of the fiber optic plate is not critical to the invention and a thickness of 1–5 mm is typical. The operation of the illumination system is not effected by changing the focal length or adjusting the aperture of printing lens 22.

Figure 1:
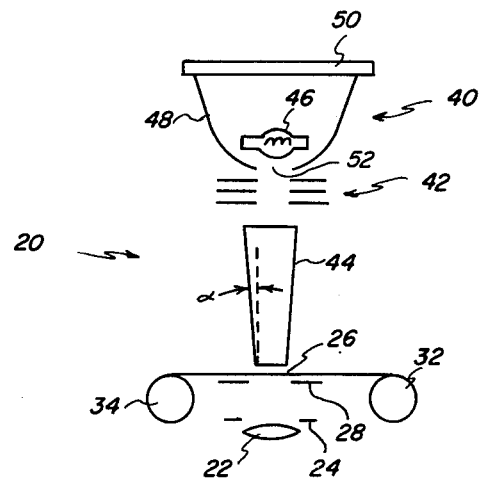
FIG. 1 is a schematic diagram of a prior art photographic printer.
Figure 1:
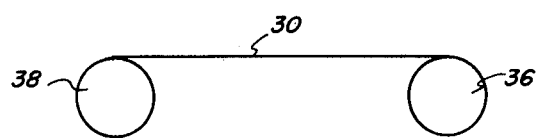
Figure 2:
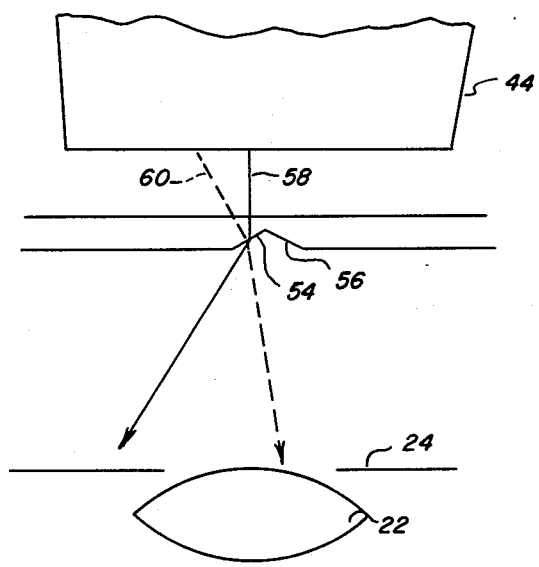
FIG. 2 is a schematic diagram illustrating the effects of a scratch in the negative on the light rays in the photographic printer.
Figure 10:
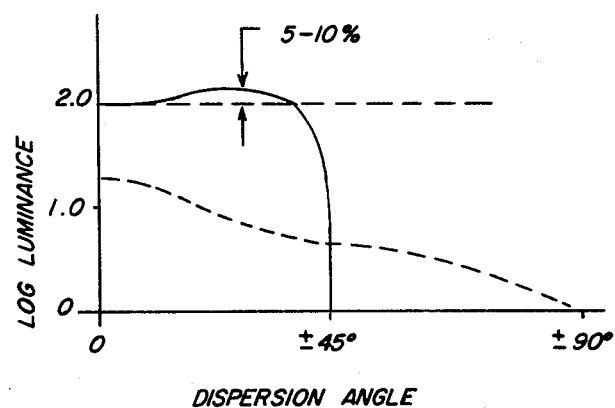
FIG. 10 is an idealized graph comparing the angular distribution of light intensity from an illumination system according to the present invention with the angular distribution of light from a prior art illumination system.

Badly scratched negatives were printed with the illumination systems according to the present invention, and the resulting prints were compared with prints produced from the same badly scratched negatives using the prior art illumination system shown in FIG. 5. It was found, that in addition to higher efficiency (thus requiring shorter exposure times), the illumination systems according to the present invention also provided better scratch suppression. Initially, this phenomenon was rather puzzling since the amount of off-axis light available to fill in the scratches appears to be equal in both the prior art systems and the new systems. However, upon closer study, it was found that the lamphouse employed in the experimental system has the property of producing a greater amount of light off-axis than on-axis. The reason that this property of the lamp house provided superior scratch suppression in the new illumination systems can be appreciated by referring to FIG. 2. It is seen that the off-axis ray of light 60 indicated by the dotted line, must travel through a greater thickness of film than the axial ray 58 that was refracted out of the aperture 24 by the scratch facet 54. Since some light is absorbed by the material, the off-axis ray is weakened in proportion to this longer path length. Furthermore, since the off-axis ray enters the film at an angle, it experiences a greater amount of surface reflection, thereby further weakening the ray. A theoretical calculation showed that if the off-axis light from the illumination system is from about 5 to about 10 percent stronger than the axial light, the effects noted above will be cancelled, thereby providing nearly perfect scratch suppression. It was a lucky accident that the particular lamphouse chosen for the experiments exhibited just this required behavior. The solid line in FIG. 10 shows an idealized angular distribution of light intensity from a printer illumination system. As shown in FIG. 10, the off-axis illumination should be from about 5 to about 10 percent greater than that on-axis. Because the Plexiglas diffuser employed in the prior art illumination system shown in FIG. 5 completely redistributed the light from the lamphouse, the greater off-axis illumination property of the lamphouse was not a factor in the performance of the prior art illumination system. The dotted line in FIG. 10 shows the luminance of the prior art illumination system versus axial displacement. Only when the light conditioning means preserves the axial distribution of the light fom a lamphouse having the greater off-axis illumination property, is the effect observed. Both embodiments of the present invention described above include the feature of preserving the angular distribution of the light produced by the lamphouse.

The invention has been described in detail with particular reference to the preferred embodiments thereof, but it will be understood that variations and modifications can be effected within the spirit and scope of the invention.

I claim:

1. In a color photographic printer having a printing lens and a film gate, an illumination system for illuminating the film gate, comprising:
   a light source for producing a beam of light having a characteristic axial brightness distribution directed towards said film gate;
   reflecting means disposed between said light source and said film gate for intercepting peripheral portions of said beam and redirecting said peripheral portions towards said film gate, so that the beam emerging from said reflecting means has a characteristic angular spread somewhere between about ±35° to about ±65°; and
   means for conditioning the light emerging from said reflecting means such that the image produced by said printing lens is substantially uniform, and such that said characteristic angular spread and said characteristic axial brightness distribution are substantially preserved, whereby scratch suppression and improved efficiency are achieved.

2. The invention claimed in claim 1 wherein said light conditioning means is a condenser lens disposed between said reflecting means and said film gate for forming multiple images of said light source in the aperture of said printing lens, the zeroth order image of said light source being substantially centered in said aperture, and the first order images thereof being partially in and partially out of said aperture.

3. The invention claimed in claim 1 wherein said light conditioning means is a light diffracting means for diffracting axial rays into relatively small angle cones of a about 5 to 10 degrees and for diffusing off-axis rays into annular cones having a similary narrow angular thickness.

4. The invention claimed in claim 1 wherein said light source is constructed so that the beam of light produced thereby is from about 5 to about 10 percent more intense off-axis thereby improving scratch suppression.

5. The invention claimed in claim 1 wherein the angular spread of said beam is about ±45°.

6. The invention claimed in claim 1, 2, or 3 wherein said reflecting means is a rectangular bar of transparent material having about a 1.5° taper and wherein the larger end of said tapered bar is disposed near said light source.

7. In a color photographic printer having a printing lens and a film gate, an illumination system for illuminating the film gate, comprising:
   a light source for producing a beam of light directed upon said film gate;
   reflecting means disposed between said light source and said film gate for intercepting peripheral portions of said beam and redirecting said peripheral portions toward said film gate;
   and
   light diffracting means disposed between said reflecting means and said film gate for diffracting each axial ray of light into relatively small angle cones of from about 5 to 10 degrees and for diffracting each off-axis ray of light into an annular cone having a similarly narrow angular thickness of from about 5 to 10 degrees, whereby an illumination system exhibiting scratch suppression, uniformity, and improved efficiency is provided.

8. The invention claimed in claim 7 wherein said light diffracting means is a fibre optic plate comprised of fibres with diameters between about 1 micron and about 20 microns.

9. The invention claimed in claim 8 wherein the diameters of said fibres are between 3 and 10 microns.

10. The invention claimed in claim 7 wherein said reflecting means is a rectangular integrating bar having between 0° and about 2° of taper, and wherein the larger end of said integrating bar is disposed near said light source.

11. The invention claimed in claim 7 wherein said light source is constructed so that its light beam is brigher off-axis than on-axis by about 5–10 percent, thereby providing improved scratch suppression.

12. In a color photographic printer having a printing lens and a film gate, an illumination system for illuminating the film gate, comprising:
   a light source for producing a beam of light having a characteristic axial brightness distribution directed toward said film gate;
   reflecting means disposed between said light source and said film gate for intercepting peripheral portions of said beam and redirecting said peripheral portions toward said film gate;
   and
   condenser lens means disposed between said reflecting means and said film gate for forming in cooperation with said reflecting means, a multiple image of said light source at the plane of the aperture of said printing lens the axial brightness distribution of said light source being preserved in said multiple image, such that an unreflected zero order image of said light source is formed in a central portion of said aperture, and a plurality of reflected images of said light source are formed round said central image, with the first order images partially in and partially out of said aperture, whereby an illumination system exhibiting scratch suppression, uniformity and improved efficiency is provided.

13. The invention claimed in claim 12 wherein said light source includes dichroic filters, a cold mirror, and a parabolic reflector for tailoring the spectral content of the light beam.

14. The invention claimed in claim 12 wherein said reflecting means is a rectangular intergrating bar having a taper between about 0° and about 2°, with the wider end located near the light source.

15. The invention claimed in claim 12 wherein said condenser lens means is integrally formed on the end of said intergrating bar.

16. The invention claimed in claim 12 wherein the axial brightness distribution of said light source is characterized by being brighter off-axis than on-axis by between about 5 and about 10 percent, thereby improved scratch suppression is provided.

17. The invention claimed in claim 3, wherein said light conditioning means comprises a fibre optic plate having fibres with diameters between about 1 micron and about 20 microns.

* * * * *